United States Patent [19]

Claydon

[11] 4,440,274

[45] Apr. 3, 1984

[54] DRUM BRAKE ANCHOR PIN ASSEMBLY

[75] Inventor: David R. Claydon, Brighton, Mich.

[73] Assignee: Eaton Corporation, Cleveland, Ohio

[21] Appl. No.: 433,575

[22] Filed: Oct. 12, 1982

Related U.S. Application Data

[63] Continuation of Ser. No. 218,318, Dec. 19, 1980, abandoned.

[51] Int. Cl.³ .......................... F16D 51/20; F16B 2/14
[52] U.S. Cl. ..................................... 188/328; 188/341; 188/206 A; 403/370; 403/371
[58] Field of Search ................... 188/206 A, 325, 327, 188/328, 329, 337, 338, 341; 403/366, 370, 371

[56] References Cited

U.S. PATENT DOCUMENTS

| | | | |
|---|---|---|---|
| 1,120,368 | 12/1914 | Booraem et al. | 403/371 |
| 2,022,032 | 11/1935 | Fowler | 188/338 |
| 3,136,390 | 6/1964 | Zukowski | 188/341 |
| 3,687,246 | 8/1972 | Vath | 188/329 |
| 4,280,598 | 7/1981 | Pöllinger | 403/371 |

Primary Examiner—Douglas C. Butler
Assistant Examiner—R. R. Diefendorf
Attorney, Agent, or Firm—C. H. Grace; H. D. Gordon

[57] ABSTRACT

An anchor pin assembly (100) for a drum brake (10) is provided. The anchor pin assembly is mountable to a drum brake spider (14) provided with an anchor pin receiving bore (34). The assembly includes two anchor pin pieces (102 and 104) having inclined ramps (116 and 118) formed on the inner ends thereof, an expansion member (120) having mating ramps (122 and 124) formed thereon and a bolt (132) and nut (138) for applying an axially inward compressive force to the pieces to cause radially outward expansion of the expansion member.

8 Claims, 5 Drawing Figures

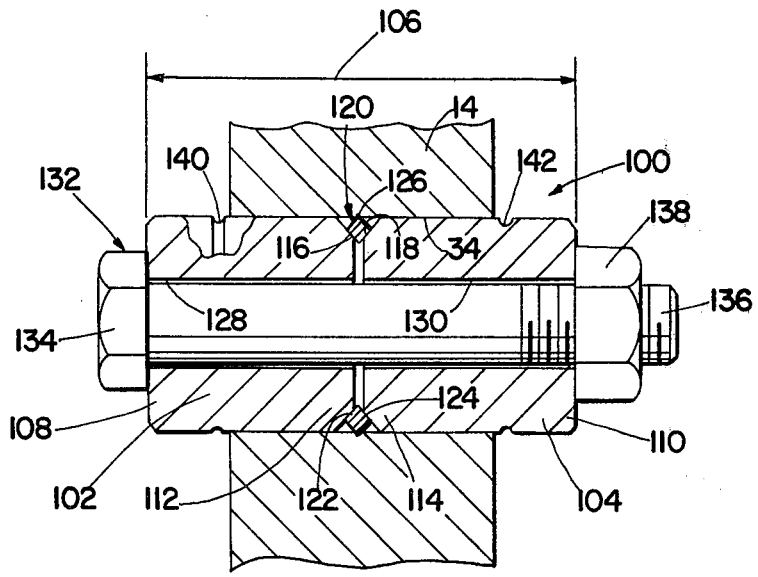
Fig. 3
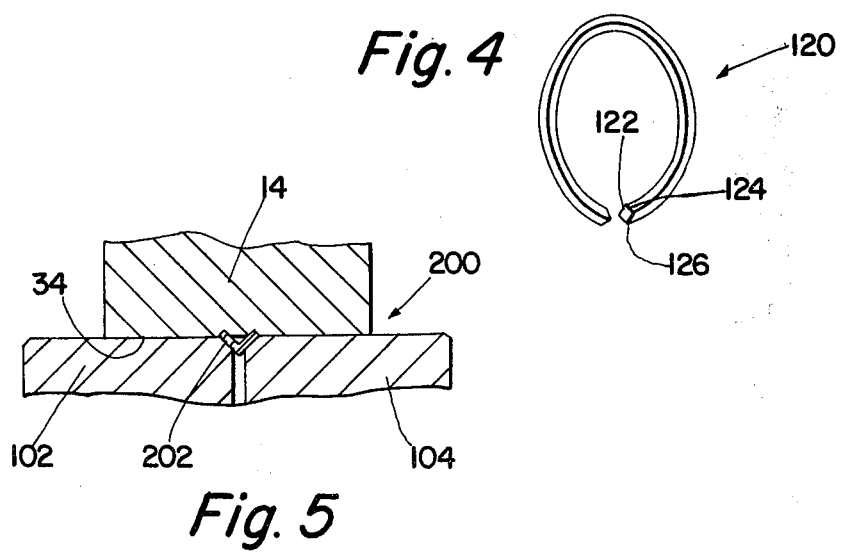
Fig. 4
Fig. 5

DRUM BRAKE ANCHOR PIN ASSEMBLY

This is a continuation of application Ser. No. 218,318, filed Dec. 19, 1980, abandoned.

BACKGROUND OF THE INVENTION

1. Field of the Invention

This invention relates to anchor pin assemblies, and in particular to anchor pin assemblies for drum brakes. More particularly, this invention relates to an anchor pin assembly for drum brakes which will permit easy replacement of a deformed, worn and/or dislodged anchor pin.

2. Description of the Prior Art

Drum brakes having a pair of generally arcuate brake shoes pivotably mounted at one end to an anchor structure and selectively actuatable at the other ends thereof to pivot radially outwardly relative to the anchor structure to frictionally engage a brake drum are well known in the prior art. Usually, the brake shoes comprise an arcuate table carrying the friction material and at least one radially inwardly extending rib or web. Typically, the pivotably mounted ends of the brake shoe webs are formed with either generally concave surfaces or generally annular apertures which are pivotably supported by an anchor structure comprising a single anchor pin, or a pair of anchor pins, fixed to the brake spider. A resilient retaining member, or members, such as a coil tension spring may be utilized to retain the brake shoes against the anchor member. Examples of such prior art drum brakes may be seen by reference to U.S. Pat. Nos. 2,710,076; 3,398,814 and 3,467,229, all assigned to the assignee of this invention and all hereby incorporated by reference.

While these prior art devices are generally satisfactory and enjoy great commercial success, a problem has occasionally existed with the anchor pin, or pins, thereof. The anchor pins of the prior art devices were usually fixedly mounted to support structure, usually referred to as the brake spider, as by a staked press fit. When the anchor pins occasionally became loose, dislodged and/or otherwise damaged, it was difficult to replace same, especially if a press and/or specialized fixtures were not readily available, and often a new spider assembly was required. In certain types of brakes, such as trailer axle brakes, wherein the spider was welded, or otherwise nonremovably attached, to an axle housing, this situation was particularly unsatisfactory.

SUMMARY OF THE INVENTION

In accordance with the present invention, the drawbacks of the prior art have been reduced or eliminated by the provision of an anchor pin assembly for drum brakes which will permit relatively quick assembly of an anchor pin to a drum brake spider without the requirement of special fixtures and/or a press and/or removal of the spider from the vehicle. The anchor pin assembly of the present invention comprises two generally cylindrical anchor pin pieces having an outer diameter generally equal to the inner diameter of the bore in the spider provided to receive the anchor pin, an expansion member adapted to be received between adjacent inner ends of the pin pieces and to be expanded radially outwardly as the pieces are forced axially together, and means to apply and maintain a compressive axially inward force on the remote ends of the pieces. In the preferred embodiment, the anchor pin pieces each have an axially extending bore therethrough, concentric with the outer diameter surfaces thereof, and a headed fastener is received through the bores with a nut threadably attachable at one end thereof for applying a compressive axially inward force to the two anchor pin pieces. To assemble the anchor pin assembly to a spider, the two pieces, with the expansion member positioned therebetween are positioned in the spider anchor pin receiving bore, the threaded fastener is inserted through the bores in the pieces and the nut is tightened to force the pieces axially together, causing the expansion member to expand radially outwardly to engage the spider anchor pin receiving bore and axially lock the assembly to the spider.

Accordingly, it is an object of the present invention to provide a new and improved anchor pin assembly for a drum brake.

This and other objects and advantages of the present invention will become apparent from a reading of the detailed description of the invention taken in connection with the drawings.

BRIEF DESCRIPTION OF THE DRAWINGS

FIG. 3 is a fragmentary view of the anchor pin assembly of the present invention.

FIG. 4 is a perspective view of the expansion member of FIG. 3.

FIG. 5 is a fragmentary view of the an alternate embodiment of the anchor pin assembly of the present invention.

DESCRIPTION OF THE PREFERRED EMBODIMENT

Figure 1:
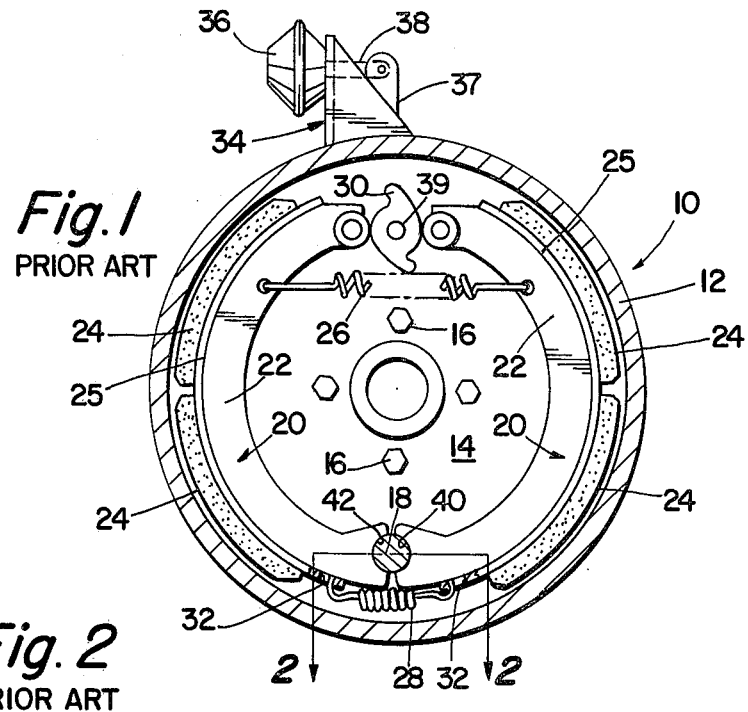
FIG. 1 is an illustration of an expanding shoe drum brake of the type with which the present invention may be utilized.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the designated parts. Said terminology will include the words above specifically mentioned, derivatives thereof and words of similar import.

Drum brakes, such as vehicle drum brake assembly 10, are well known and an example thereof may be seen by reference to FIG. 1.

Drum brake assembly 10 comprises an annular rotatable brake drum 12, a brake support member or spider 14 nonrotatably secured to the vehicle by a plurality of fasteners 16, a brake shoe pivot or anchor pin 18 secured to the spider 14, a pair of opposed arcuate brake shoes 20 including brake lining supports or webs 22 and a brake lining 24 of suitable friction material carried by the tables 25, brake shoe return springs 26, brake shoe retaining springs 28 for retaining the shoes 20 on anchor pin 18, and a cam element 30 for causing radially outwardly pivotal movement of the brake shoes 20 about anchor pin 18 for braking the movement of the vehicle. The retaining springs 28 of brake assembly 10 are tension springs retained in apertures 32 formed in the tables 25.

A brake actuator support, or air motor bracket, 34 is fixed to the spider 14 and a brake actuator, such as an air motor 36, is fixed to the actuator support. Oscillatory movement of the actuator 36 is converted into rotational movement of the cam 30 by means of a link 38, a lever or slack adjuster body 37 and a cam shaft 39 as is well known in the prior art. Although a rotatable cam 30 is illustrated, other actuation means, such as wedges or the like, may be utilized as is known in the art.

Figure 2:
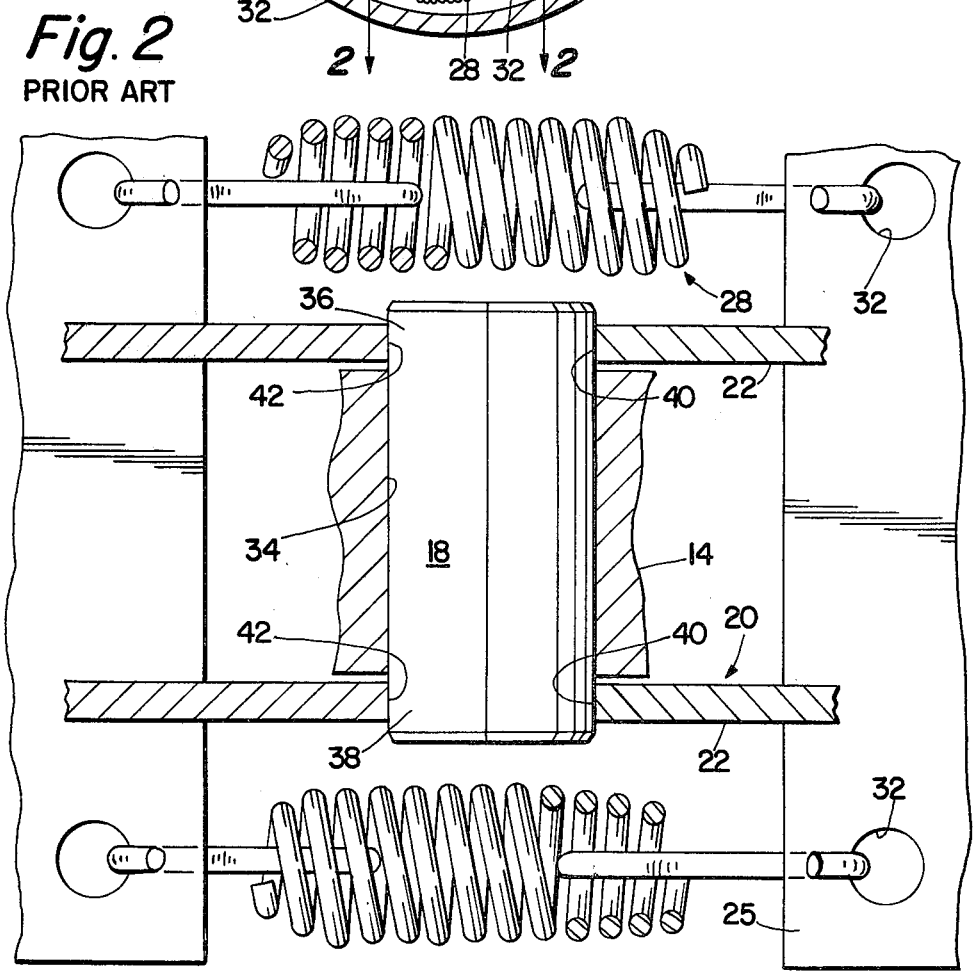
FIG. 2 is a fragmentary view of the anchor pin mounting means of the prior art taken on line 2—2 of FIG. 1.

The prior art mounting of anchor pin 18 to spider 14 may be seen by reference to FIG. 2. Briefly, spider 14 is provided with a through bore 34 in which anchor pin 18 is staked in a press fit. The opposite outer ends, 36 and 38, of the anchor pin 14, will extend axially beyond the bore 34 for pivotal receipt of the concave cavities, 40 and 42, formed in the webs 22. It is understood that, in drum brakes of the type utilizing two or more anchor pins, the webs may be provided with annular apertures instead of the concave cavities. Although assembly of anchor pins to spiders by the method described above and illustrated in FIG. 2 is satisfactory for assembly purposes in a facility, such as a factory, having the proper press equipment and fixtures and assembling unused anchor pins to unused spiders, this method is often not satisfactory if the proper equipment and fixtures are not available and/or if the spider has been used for a period of time.

The anchor pin assembly 100 of the present invention is illustrated in FIGS. 3 and 4. Although the anchor pin assembly 100 is suitable for assembly of anchor pins to drum brake spiders at a factory, it is expected that the assembly 100 will be most useful for assembling replacement anchor pins to spiders in a field location.

FIG. 3 illustrates a spider 14 having a bore 34 from which the original anchor pin 18 has been removed and replaced by the anchor pin assembly 100 of the present invention.

Anchor pin assembly 100 includes two anchor pin pieces, 102 and 104, having a combined axial length 106 generally equal to the axial length of the original equipment, factory installed anchor pin 18. The anchor pin pieces, 102 and 104, each have an outer end, 108 and 110, respectively, on which the brake shoe webs 22 will pivot and an inner end, 112 and 114, respectively. The inner ends, 112 and 114, of the anchor pin pieces, 102 and 104, respectively, are beveled to define radially and axially inwardly extending ramps, 116 and 118, respectively. The anchor pin pieces are of an outer diameter generally equal to or slightly less than the inner diameter of anchor pin receiving bore 34 of spider 14. An expansion member 120 is interposed the axially inwardly ends, 112 and 114, of the anchor pin pieces.

As may be seen by reference to FIGS. 3 and 4, expansion member 120 is a split ring of generally diamond shaped cross section, having inclined surfaces, 122 and 124, complementary with ramps, 116 and 118, respectively. Member 120 may be radially compressed to have an outer diameter, measured at apex point 126, equal to or less than the inner diameter of the bore 34. Member 120, when compressed between ramps 116 and 118, will be expanded radially outwardly to have an outer diameter, measured at apex point 126, greater than the inner diameter of anchor pin receiving bore 34.

Anchor pin pieces, 102 and 104, each have an axially extending through bore 128 and 130, respectively, therethrough which bores are generally coaxial with the outer diameters surfaces thereof. An externally threaded fastener 132, such as a bolt having a head 134 and a threaded end 136 is received through bores 128 and 130 and a nut 138 is threadably received on end 136 for applying an axially inwardly compressive force on the outer ends, 108 and 110, respectively, of the anchor pin pieces, 102 and 104, respectively. Anchor pin pieces, 102 and 104, may be provided with markings, such as positioning grooves, 140 and 142, respectively, or other indicia, for indicating when the anchor pin pieces are properly axially positioned in bore 34.

Nut 138 may be a lock nut and/or may include tension indicating means as is well known in the art. Expansion ring 120 may be of a hardened material and is preferably harder than spider 14.

A slightly modified alternate embodiment of the present invention may be seen by reference to FIG. 5. FIG. 5 illustrates an anchor pin assembly 200 utilizing a generally cross sectionally "V"-shaped split ring expansion member 202 in place of the diamond shaped expansion member 120 of the assembly 100 described above.

To replace a worn, damaged and/or dislodged original equipment, factory installed anchor pin 18, with the anchor pin assembly 100 of the present invention, the following procedure may be utilized. First, the original equipment anchor pin 18 is removed from anchor pin receiving bore 34 in spider 14. The anchor pin pieces, 102 and 104, with expansion member 120 (or 202) positioned between the axially inner ends, 112 and 114, of the pieces are then positioned in bore 34. Positioning indicia, 140 and/or 142 may be utilized for this purpose. Bolt 132 is then inserted though the throughbores, 128 and 130, and nut 138 is tightened on bolt end 136 to apply a compressive force between the pieces to force expansion member 120 (or 202) radially outward to engage and/or embed in the inner diameter surface of bore 34 to axially fix anchor pin assembly 100 (or 200) to spider 14. Bolt 132 and nut 138 may preassembled, but not in tension, through the anchor pin pieces prior to insertion of assembly 100 (or 200) into bore 34.

It may thus be seen that an anchor pin assembly may be assembled to a spider having a spider receiving bore therein utilizing commonly available tools, such as wrenches, without the requirement of specialized tools, fixtures and/or removal of the spider from the vehicle.

Although the preferred embodiments of the present invention have been described with a certain degree of particularity, it is understood the present description is by way of example only and that certain rearrangement and/or substitution of the parts is possible without departing from the spirit and the scope of the invention as hereinafter claimed.

I claim:

1. A selectively removable anchor pin assembly for a drum brake having a spider and a pair of generally arcuate brake shoes pivotably mounted on said anchor pin assembly, each of said brake shoes having a pair of generally parallel webs straddling said spider and defining generally concave pivot cavities, said spider having an anchor pin bore therethrough of generally annular generally uniform inner diameter in which said anchor pin assembly is selectively removably fixedly mountable, said anchor pin assembly comprising:

substantially identical first and second generally cylindrical anchor pin pieces, each of said pieces provided with an axially extending through bore generally concentric with the outer diameter surfaces thereof, said pieces having an outer diameter generally equal to the inner diameter of said anchor pin receiving bore, the combined axial length of said anchor pin pieces exceeding the axial length of said receiving bore, each of said pieces having an outer end for extending beyond said anchor pin receiving bore for providing a fixed cylindrical pivot surfce on each side of said bore and an inner end, each of said inner ends having an axially and radially inwardly extending ramp formed thereon, an expansion member interposed said inner ends of said pieces, said expansion member having a radially and axially inwardly inclined surface formed on each axial end thereof for sliding engagement with said ramps, said expansion member being radially inwardly resiliently deformable to an outer diameter less than the inner diameter of said anchor pin receiving bore, compression of said expansion member between said pieces effective to radially expand said expansion member to an outer diameter greater than the inner diameter of said anchor pin receiving bore, and means received through said axially extending bores in said pieces for applying and maintaining an axialy inwardly compressive force on said pieces.

2. The assembly of claim 1 wherein said means comprises a bolt received through said axially extending bores and a nut threadably received on said bolt, said bolt having a head for applying an axially inward force on the outer end of one of said pieces and said nut having a surface for applying an axially inward force on the outer end of the other of said pieces.

3. The assembly of claim 2, wherein the outer diameter of said expansion member is defined by a point.

4. The assembly of claim 2, wherein said expansion member is a split ring of generally diamond-shaped cross section.

5. The assembly of claims 3 or 4, wherein said expansion member is of a material having a greater hardness than the material of said spider.

6. The assembly of claim 2, wherein said expansion member is a split ring of generally V-shaped cross section.

7. The assembly of claim 2, wherein said pieces carry indicia marks on the outer diameter surfaces thereof for positioning said pieces in said anchor pin receiving bore.

8. The assembly of claim 2 wherein said inner and outer ends of said pieces are substantially identical.

* * * * *